US012585525B2

(12) United States Patent
Chatterjee et al.

(10) Patent No.: US 12,585,525 B2
(45) Date of Patent: Mar. 24, 2026

(54) BUSINESS LANGUAGE PROCESSING USING LoQoS AND rb-LSTM

(71) Applicant: International Business Machines Corporation, Armonk, NY (US)

(72) Inventors: Srijeet Chatterjee, Kolkata (IN); Yanas Rajindran, Kannur (IN); Chandrajyothi Hari, Hyderabad (IN); Srinivas Jayanti, Frisco, TX (US); Alli KS, Bangalore (IN); Vinayak P Honrao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1051 days.

(21) Appl. No.: 17/535,844

(22) Filed: Nov. 26, 2021

(65) Prior Publication Data

US 2023/0168989 A1     Jun. 1, 2023

(51) Int. Cl.
G06F 11/07 (2006.01)
G06N 3/088 (2023.01)

(52) U.S. Cl.
CPC ...... G06F 11/0775 (2013.01); G06F 11/0706 (2013.01); G06F 11/0769 (2013.01); G06N 3/088 (2013.01)

(58) Field of Classification Search
CPC ............. G06F 11/0775; G06F 11/0706; G06F 11/0769; G06N 3/088
See application file for complete search history.

(56) References Cited

U.S. PATENT DOCUMENTS

| | | | |
|---|---|---|---|
| 9,697,352 | B1 | 7/2017 | Armstrong |
| 10,977,293 | B2 | 4/2021 | Cai et al. |

(Continued)

FOREIGN PATENT DOCUMENTS

| | | | |
|---|---|---|---|
| CN | 110415702 A | * | 11/2019 |
| EP | 3502988 A1 | | 6/2019 |

OTHER PUBLICATIONS

Eichhorn Garrett. "Predict IT Support Tickets with Machine Learning and NLP via supervised, classification techniques in Python", Retrieved from: https://medium.com/towards-data-science/predict-it-support-tickets-with-machine-learning-and-nlp-a87ee1cb66fc, Apr. 20, 2020, 8 pages.

(Continued)

*Primary Examiner* — Ryan Barrett
(74) *Attorney, Agent, or Firm* — Harrity & Harrity, LLP

(57) ABSTRACT

Provided is a language processing system and method for training a machine learning model to match two sets of text content such as incidents and solutions. In one example, the method may include storing a plurality of incident-solution pairs, generating latent scoring values for the plurality of incident-solution pairs based on latent features identified within the plurality of incident-solution pairs, building a data structure with incident-solution data from the plurality of incident-solution pairs stored therein, where each row in the data structure corresponds to a different incident-solution pair, and the data structure comprises one or more of a column for incident data, a column for solution data, and a column for latent scoring values, and inputting the data structure into a machine learning model to train the machine learning model to identify solutions from incidents.

20 Claims, 8 Drawing Sheets

240

210B

242

| | SME #1 | SME #2 | SME #3 | SME #4 | | LoQoS |
|---|---|---|---|---|---|---|
| Incident / Solution #1 | 4.1 | 2.6 | 3 | 1.7 | | 2.5 |
| Incident / Solution #2 | 3.6 | 2.2 | 2.7 | 1.5 | | 2.3 |
| Incident / Solution #3 | 3.9 | 2.4 | 3 | 1.6 | | 2.7 |
| Incident / Solution #4 | 3.2 | 2 | 2.4 | 1.3 | | 2.2 |

(56)     References Cited

U.S. PATENT DOCUMENTS

| | | | | |
|---|---|---|---|---|
| 11,037,073 | B1 * | 6/2021 | Watkins | G06F 16/953 |
| 11,095,544 | B1 * | 8/2021 | Asesh | H04L 41/064 |
| 2015/0294244 | A1 * | 10/2015 | Bade | G06Q 10/063 |
| | | | | 705/7.11 |
| 2017/0154292 | A1 * | 6/2017 | Venkataraman | |
| | | | | G06Q 10/063114 |
| 2018/0285768 | A1 | 10/2018 | Karuppasamy | |
| 2019/0089577 | A1 * | 3/2019 | Misra | G06N 20/00 |
| 2019/0347282 | A1 * | 11/2019 | Cai | G06N 5/022 |
| 2020/0210924 | A1 * | 7/2020 | Ghosh | G06N 5/022 |
| 2021/0042469 | A1 * | 2/2021 | Saito | G06F 40/20 |
| 2021/0049700 | A1 * | 2/2021 | Nguyen | G06N 3/044 |
| 2021/0133581 | A1 * | 5/2021 | Podgorny | G06F 40/35 |
| 2022/0358005 | A1 * | 11/2022 | Saha | G06F 40/216 |
| 2025/0130884 | A1 * | 4/2025 | Wong | G06N 3/0455 |
| 2025/0156259 | A1 * | 5/2025 | Shtilkind | G06F 11/0709 |
| 2025/0173607 | A1 * | 5/2025 | Talwalkar | G06N 20/00 |

OTHER PUBLICATIONS

"Smart Incident Management with AI-Powered Analytics & NLP Topic Clustering", Retrieved from: https://www.brighttalk.com/webcast/14513/364978/smart-incident-management-with-ai-powered-analytics-nlp-topic-clustering, date unknown, 7 pages.

* cited by examiner

FIG. 2A                200
210A
|  | SME #1 | SME #2 | SME #3 | SME #4 |
|---|---|---|---|---|
| Incident / Solution #1 |  | 2.6 (-0.2) | 3 (+0.2) |  |
| Incident / Solution #2 | 3.6 (+0.6) |  | 2.7 (-0.3) |  |
| Incident / Solution #3 |  | 2.4 (+0.3) |  | 1.6 (-0.5) |
| Incident / Solution #4 |  | 2 (+0.1) | 2.4 (+0.5) | 1.3 (-0.6) |
212
214
220
| | LF #1 | LF #2 |
|---|---|---|
| Incident / Solution #1 | 1.8 | 0.8 |
| Incident / Solution #2 | 1.4 | 0.9 |
| Incident / Solution #3 | 1.5 | 1 |
| Incident / Solution #4 | 1.2 | 0.8 |
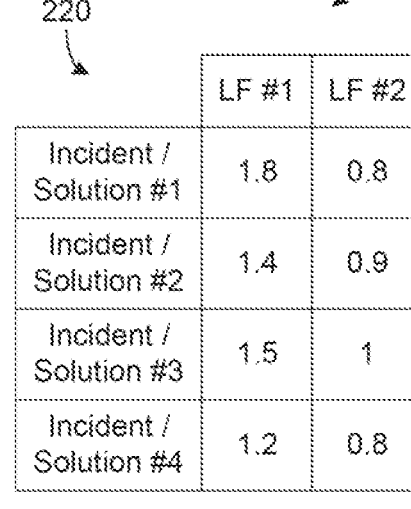
230
| | SME #1 | SME #2 | SME #3 | SME #4 |
|---|---|---|---|---|
| LF #1 | 1.5 | 1.2 | 1 | 0.8 |
| LF #2 | 1.7 | 0.6 | 1.5 | 0.4 |

| | SME #1 | SME #2 | SME #3 | SME #4 | | LoQoS |
|---|---|---|---|---|---|---|
| Incident / Solution #1 | 4.1 | 2.6 | 3 | 1.7 | | 2.5 |
| Incident / Solution #2 | 3.6 | 2.2 | 2.7 | 1.5 | | 2.3 |
| Incident / Solution #3 | 3.9 | 2.4 | 3 | 1.6 | | 2.7 |
| Incident / Solution #4 | 3.2 | 2 | 2.4 | 1.3 | | 2.2 |

400

410

420

Encoder

Decoder

S(i): Attention weights for
Encoded inputs at t = i

C(i-1): Cell State
at t = i - 1

500

510

Storing a Plurality of Incident-Solution Pairs

520

Generating Latent Scoring Values based on Latent Features within the Plurality of Incident-Solution Pairs

530

Building a Data Structure with the Incident-Solution Pairs and the Scoring Values

540

Inputting the Data Structure into a Machine Learning Model to Train the Machine Learning Model

600

BUSINESS LANGUAGE PROCESSING USING LoQoS AND rb-LSTM

BACKGROUND

Tickets are used in various business-related domains as a mechanism by which users can submit incidents or other issues that require resolution. For example, tickets may be used in information technology (IT), Internet of Things (IoT), the retail industry, the restaurant industry, and the like. The successful resolution of an incident detailed by the ticket is referred to as a solution. Solutions are typically created and/or performed by users (people) who review the incident details from the ticket and take some overt action to resolve the issue. In the IT industry, the issue is often resolved by an IT professional visiting a work station of a user that submitted the incident and resolving the issue at the work station. When the issue is resolved, the IT professional may post a solution or other note describing how the issue was resolved within a ticketing software application. However, resolving the incidents typically requires significant time and effort from a human (e.g., a subject matter expert, etc.)

SUMMARY

One example embodiment provides an apparatus that includes a memory configured to store a plurality of incident-solution pairs, and a processor configured to one or more of generate latent scoring values for the plurality of incident-solution pairs based on latent features identified within the plurality of incident-solution pairs, build a data structure with incident-solution data from the plurality of incident-solution pairs stored therein, where each row in the data structure corresponds to a different incident-solution pair, and the data structure comprises one or more of a column for incident data, a column for solution data, and a column for latent scoring values, and input the data structure into a machine learning model to train the machine learning model to identify solutions from incidents.

Another example embodiment provides a method that includes one or more of storing a plurality of incident-solution pairs, generating latent scoring values for the plurality of incident-solution pairs based on latent features identified within the plurality of incident-solution pairs, building a data structure with incident-solution data from the plurality of incident-solution pairs stored therein, where each row in the data structure corresponds to a different incident-solution pair, and the data structure comprises one or more of a column for incident data, a column for solution data, and a column for latent scoring values, and inputting the data structure into a machine learning model to train the machine learning model to identify solutions from incidents.

A further example embodiment provides a non-transitory computer-readable medium comprising instructions, that when read by a processor, cause the processor to perform one or more of storing a plurality of incident-solution pairs, generating latent scoring values for the plurality of incident-solution pairs based on latent features identified within the plurality of incident-solution pairs, building a data structure with incident-solution data from the plurality of incident-solution pairs stored therein, where each row in the data structure corresponds to a different incident-solution pair, and the data structure comprises one or more of a column for incident data, a column for solution data, and a column for latent scoring values, and inputting the data structure into a machine learning model to train the machine learning model to identify solutions from incidents.

BRIEF DESCRIPTION OF THE DRAWINGS

Figure 1A:
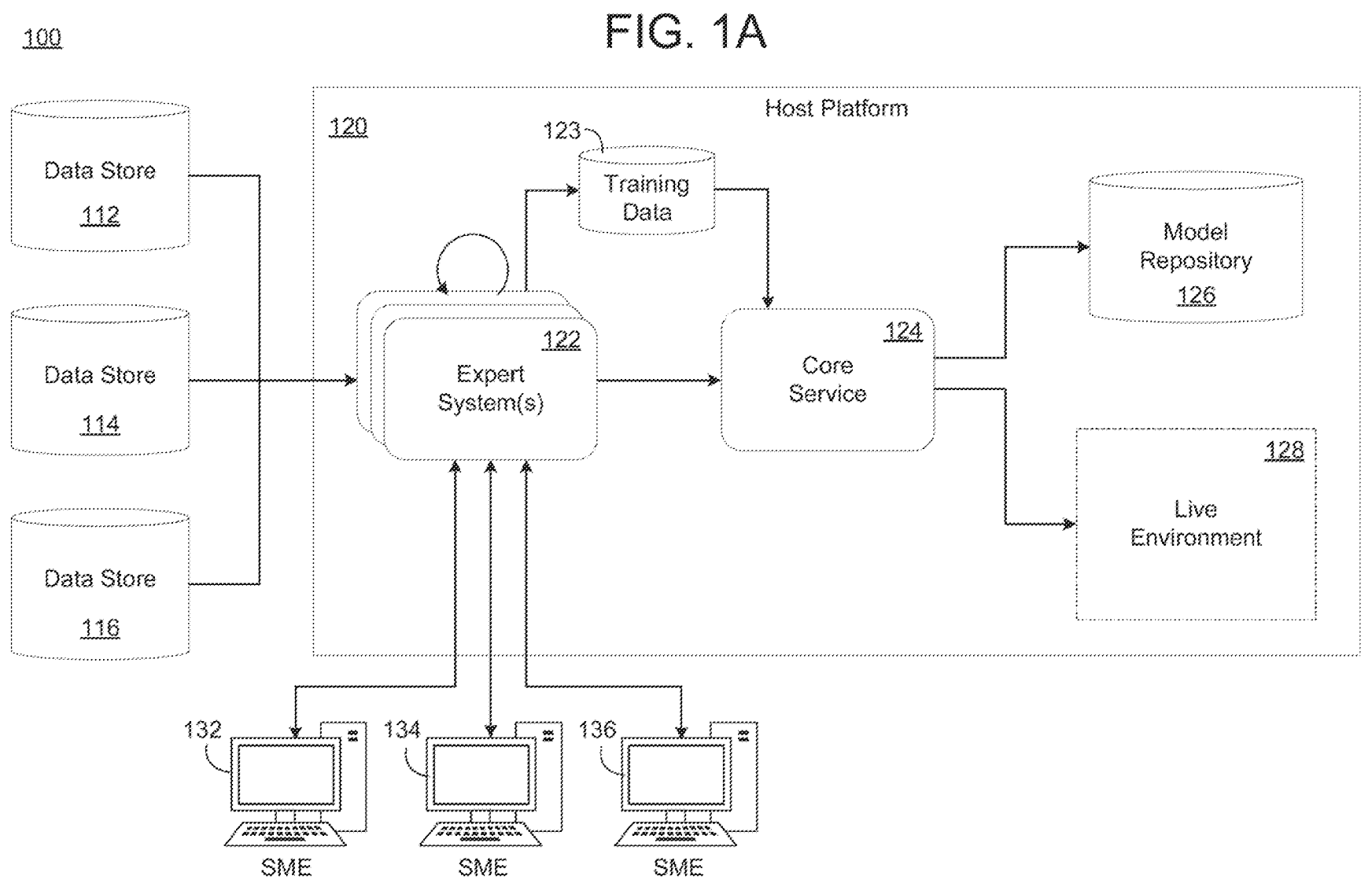

FIG. 1A is a diagram illustrating a host environment for language process according to example embodiments.

FIG. 2A is a diagram illustrating a process of decomposing a scoring array into sub-matrices based on latent features according to example embodiments.

FIG. 2B is a diagram illustrating a processing of filling-in values in the scoring array based on the latent features according to example embodiments.

DETAILED DESCRIPTION

Figure 1B:
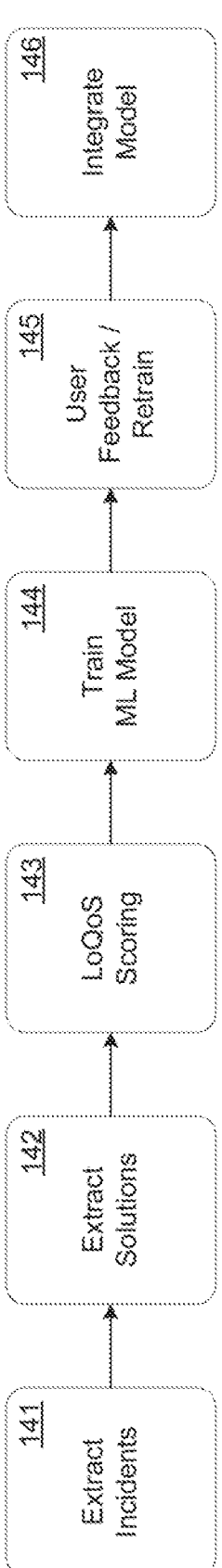
FIG. 1B is a diagram illustrating an end-to-end sequence of steps for language processing according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer-readable media, devices, and/or networks, which are directed to a system for scoring incident-solution pairs used in training and training a machine learning model to identify solutions from incidents. The machine learning model may include a neural network architecture that includes a boosted long short-term memory (LSTM) thereby improving the accuracy of the machine learning model than in comparison to when the model includes a traditional recurring neural network (RNN).

Finding or otherwise predicting a solution for any problem, query, ticket, etc., from a corpus of possible solutions and multiple dimensions/data features can be a challenging task. Part of the challenge is identifying domain-specific features for a particular business domain and then using these domain-specific features to identify solutions. For example, business language processing (defined as texts and words used in the software industry with a different meaning with respect to natural language processing) can be difficult to perform when there are a significant number of ticket with unorganized details captured in every ticket. Therefore, the process of finding a solution for a ticket may be performed by a human.

Typically, a resolver team of users will check every ticket, understand the ticket, context, relate with multiple dimensions of business domain-application-module-activity-action perspective, refer numerous documents, technically come up with solution and take action on each ticket to solve the incident. Thus, a user is connecting all the dimensions in the production environment, to perform all the activities to accurately find a solution. Therefore, building a machine learning model that can automatically identify solutions from incidents is a challenging task because this involves bringing structure to a user-performed unstructured process that has a high dependency of experience and knowledge of the resolver.

Other problems that contribute to making the process difficult is the quality of training data. The available training data may be a large set (e.g., thousands of records, data, etc., or more) for some of business domain/service lines. However, identifying which training data is helpful/more valuable is difficult. Furthermore, it's also difficult to label a manual verification of an incident-solution pair quality before feeding it to a model. Defining an expert system to justify the quality of an incident-solution pair is also very difficult because it requires at least one subject matter expert for all types of applications. In the case of incident-solution pairs, the score may depend heavily on the implicit knowledge of the evaluator (SME), for example higher rating scores of SME with broader knowledge. Therefore, with the multidimensional problem of scoring a large volume of training data, labelling the training data, and being accurate in doing so can be a difficult challenge to automate.

To address these drawbacks in the art, the example embodiments provide a system that can score and filter training data based on latent features that are identified and modeled. The latent features can be used to automatically score training data for training the machine learning model. Also, the scores can be used to filter out various training items/samples. According to various embodiments, the training data used for training the machine learning model can be scored using a novel automated approach for incident-solution pair scoring. For example, a set of tickets or a subset of the tickets (e.g., a small percentage of 20-30%, etc.) can be automatically scored using a scoring algorithm based off of multiple attributes. The automated scores can be further refined by one or more users (e.g., subject matter experts of the particular business domain, etc.) The refined scores can be compared with the automated scores to identify latent features that exist within the incident-solution pairs. In particular, a gradient descent algorithm can be used to decompose latent features from the incident-solution pairs based on the automated scoring and the refined scores. The gradient descent algorithm can then be used to identify latent features The latent features can then be used for automatically generating scores for the remaining incident-solution pairs in the training data. Thus, a person does not need to go through and manually define a score for all incident-solution pairs. Rather, only a small percentage of the incident-solution pairs.

The final refined/automated scores can be added to the training data and used by the host platform when training the machine learning model. For example, the scores may be used to determine how much weight to apply to various training examples within the training data when training the machine learning model. The trained machine learning model can be used to predict an answer (e.g., a solution, etc.) to an incoming ticket (e.g., an incident, etc.) The machine learning model can be a sequence-to-sequence ("Seq2Seq") model that is trained using historical question-answer pairs (e.g., incident-solution pairs, etc.) which have already been performed by a subject matter expert.

In some embodiments, the machine learning model may include a neural network that performs the function of an autoencoder that includes an encoder-decoder architecture in which both the encoder and the decoder include a modified/boosted LSTM. In the example embodiments, the autoencoder may be designed differently than a traditional autoencoder by adding an LSTM in the encoder architecture in place of a simple recurring neural network (RNN) to ensure that the machine learning model does not suffer from vanishing or exploding gradients.

Latent features are hidden features within the textual data. In the example embodiments, the latent features can be derived using mathematical models based on differences between an automated score created by the host platform and a modified score provided by a subject matter expert. Differences between the two scores can be used by the system to identify latent features that are of interest to various subject matter experts. The latent features can then be used to score other training data sets that have not been auto-scored or reviewed by a subject matter expert. The combination of the scoring based on latent features and the modified LSTM architecture create a machine learning model that can more accurately identify answers to questions (e.g., solutions from incident tickets, etc.) than in comparison being trained without the scoring and/or the modified LSTM architecture. The training process may also be modified to include training the machine learning model with training data that has been scored.

Training of the machine learning model can be a time-consuming process. A deep learning neural network may be trained to learn a mapping function between inputs and outputs. Here, the machine learning model may be iteratively executed on training data and continually modified until the machine learning model has a certain prediction accuracy or the learning process gets stuck and stops. Improving the prediction accuracy can be achieved by updating initial parameters (e.g., weighted values, etc.) of the model (e.g., of the numerical values assigned to the different parameters, etc.) after each training iteration to continually reduce errors the model makes when making predictions based on a training data set. Unlike other machine learning algorithms, the parameters of a neural network must be found by solving a non-convex optimization problem with many good solutions and many misleadingly good solutions. A stochastic gradient descent algorithm can be used to solve the optimization problem where model parameters are updated each iteration using a back-propagation algorithm.

Once trained, the machine learning model can be stored in an executable file within a repository where it can be downloaded, etc. As another example, the trained model may be deployed into a live environment where it is able to start making predictions on live data. The machine learning model described herein can be retrained based on its own predictions. For example, the text content of an incident and the text content of a predicted solution may be paired together and used as a training example for retraining the machine learning model based on its own data predictions.

FIG. 1A illustrates a host environment 100 for language process according to example embodiments, and FIG. 1B an end-to-end process 140 including steps that may be performed by the host environment 100 for language processing according to example embodiments. Referring to FIG. 1A, the host environment 100 may include a host platform 120 such as a cloud computing platform, a web server, a distributed database, and the like. The host platform 120 may host an expert system 122 that includes the logic for performing the scoring process described herein. For example, the expert system 122 may be software process, program, service, application, etc. which is configured to retrieve log data and other incident/solution data from one or more of data stores 112, 114, and 116 that may be hosted locally on the host platform 120 or remotely by a third-party service, etc.

The expert system 122 may extract incidents and solutions that are paired with the incidents within the logs and store this information is a training data set such as a table, a spreadsheet, a document, an extensible markup language (XML) file, a JavaScript Object Notation (JSON) file, or the like. The training data set may include a tabular format such as rows and columns. Each training item can include an incident, a solution, and a score, as further described herein. At least these three values can be used when training a machine learning model. The scoring may be used to give weight to the training items. The training data set may be stored in a data store 123 that is accessible by a core service 124.

As further described herein with respect to FIGS. 2A and 2B, subject matter experts (SMEs) 132, 134, and 136 may be used to score various incident-solution pairs which can then be used to identify latent features within the incident-solution pairs.

The core service 124 may iteratively execute the machine learning model on the training data stored in the data store 123 (or provided directly from the expert system 122), and train the model. Each iteration, a developer may adjust the weights of the parameters in the machine learning algorithm to reduce prediction errors until the model reaches a satisfactory prediction accuracy or it cannot learn anymore. Once trained, the model may be stored in a model repository 126 and/or launched into a live environment 128 of the host platform 120. The trained model may be a neural network that is trained as a sequence-to-sequence model configured to receive a sequence of words (e.g., an incident, etc.) as input and predict and output another sequence of words (e.g., a solution, etc.).

Thus, the machine learning model may convert text of an input incident into meaningful output text (such as a solution) but the problem is different than a traditional natural language processing situation because the texts/words used in each business domain have different meaning and context than in natural languages. For example, in the IT industry, a table may refer to a two-dimensional structure of cells. However, in the restaurant industry, a table may refer to a table of people sitting down to eat. The example embodiments address this different text/words for each business domain by detecting latent features for a particular domain and using these latent features for scoring. In doing so, the scoring is more accurate for a particular business domain.

Referring initially to FIG. 1B, the end-to-end process 140 may include logical blocks 141-146. It should also be appreciated that the end-to-end process 140 may include different or alternative logical blocks and that the logical blocks 141-146 shown in FIG. 1B are for purposes of example only. In 141, the expert system 122 (shown in FIG. 1A) may identify historical incident-solution pairs from log data. Historical may include text content describing an issue, an error, a problem, a question, etc., associated with a particular business domain (e.g., IT, retail, restaurants, etc.) The incidents may previously have been submitted in the form of tickets, messages, requests, etc. Each of the incidents may include a string of text that is structured or unstructured and which describes the problem. In some cases, the text may be input by the user who submitted the incident. As another example, the text may be created by a software application, program, etc. In 142, the expert system 122 may extract solutions corresponding to the incidents from the log.

The expert system 122 may extract the incident details from incident logs and solution details from incident logs that are provided by computers, machines, servers, cloud platforms, databases, etc. The objective is to extract the incident details and the solution details from the logs and develop a model that can be executed as part of the expert system 122 that is capable of identifying solutions from an input incident. Here, the expert system 122 may decide on a timeline and select all the incidents that were logged during that timeline. For example, the expert system 122 may submit API calls to a database (e.g., data stores 112, 114, 116, etc.) storing incidents with an identifier of the selected timeline. In response, the data store may return all of the incidents logged during that period of time.

In some embodiments, the expert system 122 may crawl the incidents stored in various database (e.g., data stores 112, 114, and 116, etc.) using APIs for extracting the incident details and incident related log using an incident number, ticket number, or other identifier. For example, the expert system 122 may submit an API call to a data store with the identifier of a particular incident (e.g., ticket ID). In response, the expert system 122 may receive all the information regarding that particular incident from the data store.

Feature selection is a process of selecting the features that will be used to train the machine learning model. Feature selection can be performed manually or automatically by the expert system 122 based on various attributes stored in the logs. Manual feature selection happens when a domain expert selects the features that the domain expert believes is going to impact the dependent variables of the machine learning model the most. Incident-solution pairs may have many different features of use such as a date on which an incident logged, an application which logged the incident, an application that provided the work around, an amount of time it takes to resolve the incident as well as individual steps which are identified as most important. This information can be obtained from the log files. Furthermore, the log files may also include descriptions of incidents and descriptions of solutions to the incidents posted therein. For example, an incident resolution description (e.g., a solution, etc.) can also be obtained from the log.

The expert system 122 may receive the logs and identify incident description and incident resolution pairs from the logs. Furthermore, in some cases, the incident description may be created by combining two features from the log together including incident details and incident description. The logic behind combining these features is to generate a more comprehensive feature referred to as "incident". The new incident feature has both a high-level description from the incident description feature and a more detailed description from the incident details feature. Thus it is possible to improvise on the generalization of the prediction created by the model because the model will have both the high level and in-detail description of the incident. However, it poses a challenge during the training of encoder-decoder model, which can be taken care of (overcome) by introducing the ReLU boosted LSTM cell further described herein, which helps in reducing the memory requirements and improving the learning rates during training using ReLU activation function.

The expert system 122 may also provide one or more dependent variables for the model for use in the of the model. Furthermore, as described above, in 142, the features of the solution details may be derived from the logs. The solution details may be captured in two different formats. In one of the formats, the solution is captured explicitly and in the other format the solution is captured from a textual conversation. The format in which the solution exists may first be captured using the expert system 122. This feature may be a binary feature for which the possible values are "true" or "false" where true means the solution is explicitly mentioned and false means that the solution is not explicitly mentioned. On a high-level perspective, one is with a specific template format and other is without template format. The template contains a set of fixed questions related to the incident and the respective answers are provided by the support team.

All of the information received by and generated by the expert system 122 may be provided or otherwise made available to a core service 124 of the example embodiments which receives the training data from the expert system 122, scores it, and then trains the machine learning model accordingly. The core service 124 checks for the solution feature because depending on the feature value it will invoke different functions. For example, if the solution value is true, then the core service 124 may directly extract the solution from the text in the log and if is false, then the core service 124 may invoke another function which may return a statement that contains the solution mentioned during the incident resolution conversation or some other value in the log.

According to various embodiments, the expert system 122 may create a training data set with the log data including the incident-solution pairs. The training data set may be stored in one or more tables recorded in files, documents, spreadsheets, etc., that are formatted for input into a machine learning model. The training data set may include a first column for incident values, a second column for solution values, and a third column for scores. Meanwhile, each row in the training data set may correspond to a different incident-solution pair.

Explicitly mentioned solutions may be captured (i.e., the text thereof) and added to the training data set. In case of implicitly mentioned solutions, the expert system 122 may divide the complete text data into a set of statements. This is being done by following the most common patterns existing in a data source. For example, a data source may attach a "user id" value at the end of each comment along with a date and time of the comment. In this example, the expert system 122 may perform a regex pattern search for the "user id" or some similar text and use it as a delimiter to divide the entire conversation log into a set of statements. Then, pattern matching can be performed to identify solutions. For example, whenever the resolver comment is: "The incident has been resolved", the expert system 122 may identify a statement just below it made by the same resolver and if the statement is more than the threshold length, system returns it as the solution. In this example, the expert system 122 provides the solution for both formats of input data. If no explicit or implicit solutions are found, the expert system 122 may return a "solution not found" string object. It should also be appreciated that other sources of data may be used to derive the incident solution pairs including a Methods and Procedure document set, and the like.

Before the expert system 122 determines to add/write the incident-solution pair details to the training data set, the expert system 122 may determine a quality of the incident solution pair for purposes of training as part of a pre-processing phase. During the pre-processing phase, the data may be incident data and the solution data may be cleaned to remove custom stop words, punctuations, various predefined text patterns (e.g., 'hello team', etc.), and the like. This ensures that the terms of interest are not removed and remain in the text while the irrelevant terms are the only terms removed.

Next, in 143, the expert system 122 may generate a latent-space-oriented quality of solution (LoQoS) score for the incident-solution pairs that is then added to the training data. The scoring process is further described herein with respect to FIGS. 2A and 2B. In a first step, the expert system 122 may generate an automated score for an incident-solution pair that identifies a quality of the incident-solution pair for training purposes. The quality score may identify how accurate the incident-solution pairing is. Next, subject matter experts may modify the quality scores based on their own knowledge of the domain. Then, the system may use the differences between the automated quality scores and modified quality scores to identify latent features/hidden features that are being used by the subject matter experts to quality score. The hidden features can be modeled into an algorithm that can then be used to score all incident-solution pairs on behalf of all SMEs, and then use the filled-in scores to determine a total LoQoS score for each incident-solution pair.

During the scoring process, a small subset of incident-solution pairs may be sent out for quality scoring to a plurality of subject matter experts. Here, different subsets of subject matter experts may provide scores on different subsets of incident-solution pairs. In parallel, the expert system 122 may use various parameters of the incident-solution pairs such as domain-specific text patterns, length of solution, parts of speech tagging, etc. to generate an initial automated score of the incident-solution pairs. The subject matter experts may provide different/alternative scores for the incident-solution pairs. According to various embodiments, the expert system 122 may use a decomposition algorithm to identify latent features within the incident-solution pairs based on a comparison of/differences between the scores automatically created by the expert system 122 and the scores added by the subject matter experts. The latent features can be modeled and used for scoring additional incident-solution pairs. Thus, every pair of incident and solution will have a quantified value indicating the quality of solution in the training data set. Furthermore, a filter can be used to select only the data points having a score that is greater than some threshold value.

In 144, the expert system 122 may train the machine learning model to predict solutions based on incidents. For example, the machine learning model may include a neural network with an autoencoder (e.g., encoder-decoder architecture, etc.) but embodiments are not limited thereto. Each word in the sequence can have an impact on the next predicted word. The encoder can encode the input text (e.g., the incident details, etc.), word-by-word into an index or vocabulary of known words. Then the output of encoder can be used by the decoder for making predictions on the output words. The decoder may use the encoder output along with a specific input word at every time instant to predict the output word. Each sentence may be assigned an end token that marks the end of the text and similarly at prediction end, another end token can be added that marks the end of the output. This passes the state from the encoder to the decoder to predict the output. According to various embodiments, the encoder and the decoder may include a ReLU boosted LSTM (rb-LSTM). Examples of the rb-LSTM are further described herein.

In 145, the expert system may receive feedback from users of the model (e.g., in a live environment) for model performance improvement. The feedback system may use different categories of predicted solution quality. For example, users may add a score to each prediction made such as 0=Irrelevant result, 1=Below Average, 2=Average, 3=Better than Average solution, and 4=Perfect. This information may then be used to retrain the machine learning model. Furthermore, every time the model predicts a solution, the solution and its incident may be used as a new incident-solution pair for training purposes. In some cases, before the incident-solution pair can be added to the training data set for retraining it must be required to have a LoQoS score above a predetermined threshold value. Therefore, both the automated scoring and the user scoring may be performed. However, this is not required.

Retraining of the machine learning model may be performed at any time and in some cases, in response to triggering events. For example, a periodic triggering rule may cause the model to be automatically retrained every predetermined amount of time elapses (e.g., every week, every month, etc.) with new incidents generated by the system along with the feedback rated incidents. Retraining may include a similar process as the training. Here, the model may be executed and parameters modified based on the new training data.

In 146, the model may be integrated into the host environment, for example, by storing the model in a model repository 126 or deploying a live instances of the model in a live environment 128 such as a live runtime environment on a cloud platform. The encoder and decoder models can be trained as python objects. The encoder and decoder models can be used/called via an application programming interface (API). To do this, the encoder and the decoder models can be serialized into a pickle file. During the API creation, all the pickle files can be loaded and deserialized back into python objects for UI and other applications to consume. Furthermore, although not shown, the host platform 120 may include a user interface that allows users to access the machine learning models via a user interface where user can enter the incident details and obtain the predicted solution as an output.

The system described herein may include a core service 124 and one or more expert systems 122 which are configured to learn latent features of a particular business domain and score incident-solution pairs based on the latent features. The system may use multiple parameters to get the initial score for incident-solution pairs. Then by vector decomposition the system can learn latent features in multidimensional space to be used to filter incident-solution pairs. The algorithm can be a machine learning algorithm that learns in an unsupervised method to create the incident-solution pairs and perform the scoring. For example, mathematical algorithms can be used to convert a double data point (i.e., incident value and solution value) into a tuple (i.e., incident value, solution value, and LoQoS), by referring domain specific multidimensional pattern, features check, length of the solution and parts of speech tagging. The system can then use vector decomposition to justify the initial scores using the latent features in a multidimensional hyperplane. As a next step, the system may use the learned latent features to enhance the accuracy of the machine learning model by generating the final scores for the entire data set (i.e., for every pair of incident-solution present in the corpus.)

A human (subject matter expert) will use his/her knowledge and experience to score the incident-solution pairs. In the example embodiments, the expert system may mimic the behavior of a subject matter expert to derive and assign the LoQoS score based on various factors and parameters. Because of this automated scoring mechanism, the amount of time necessary for humans to be involved in the training process of the machine learning model can be significantly reduced. Furthermore, time and effort can be saved and accuracy of the model enhanced by transforming large learning sets of documents, multidimensional inputs, configuration parameters and calculations into a lower set for learning and training data, thereby reducing the amount of data needed and increasing efficiency.

Figure 3:
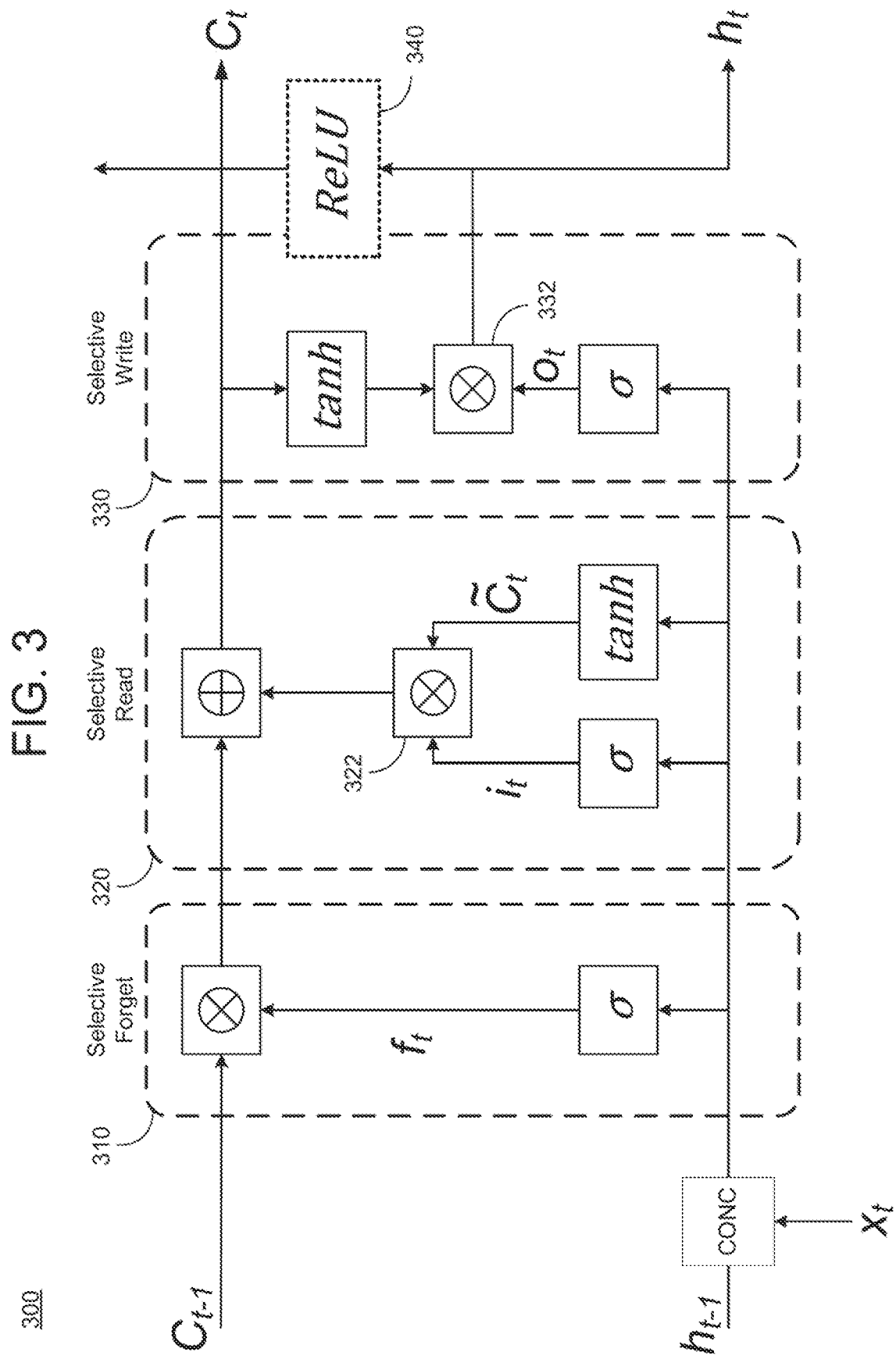
FIG. 3 is a diagram illustrating an architecture of a neural network that has been boosted with a ReLU function (e.g., a rb-LSTM, a Re-LSTM, etc.) according to example embodiments.

Furthermore, as further described with respect to FIG. 3, the machine learning model described herein may be a neural network with a new LSTM architecture that is boosted with a rectified linear unit (ReLU) function in the output gate, which reduces the naive behavior of the vanilla LSTM cells and can account for large amounts of information that are passed by concatenating the incident details from multidimensional sources. Then, the ReLU boosted LSTM cell can be used to develop the encoder decoder architecture with global attention network to make solution prediction for the searched incidents or any query or requirement.

FIG. 2A illustrates a process 200 of decomposing a scoring array 210A into sub-arrays 220 and 230 based on latent features according to example embodiments, and FIG. 2B illustrates a process 240 of filling-in values in the scoring array 210A to generate a filled-in array 210B based on the latent features according to example embodiments. When data preprocessing (e.g., cleaning, etc.) is completed, the result is a number of incident-solution pairs. Each incident may include words, sentences, characters, etc. and each solution may likewise include words, sentences, characters, and the like. The LoQoS algorithm can quantify a quality of each incident-solution pair. As a non-limiting example, scores may range between 0 and 1 where 0 depicts very poor quality and 1 depicts very good quality, however embodiments are not limited thereto.

The scoring process may include two phases as indicated by FIGS. 2A and 2B. During the first phase in process 200 of FIG. 2A, an expert system that can assign automated QoS scores is defined. Meanwhile, in process 240 of FIG. 2B, the latent features are discovered and used to fill in the missing values in the filled-in array 210B, also referred to as a scoring matrix, and generate final QoS values 242, referred to herein as LoQoS values which is an acronym for Latent Space Oriented Quality of Solution Score.

During an initial phase, the core service may generate automated quality of solution (QoS) scores for each of the incident-solution pairs. The QoS metric is the quantification of the incident-solution pair quality. To generate the automated QoS metric, the core service may consider various parameters including domain-specific features within the text of a solution, length of the solution, parts of speech tagged within the solution, and the like. For example, the domain-specific features may define a special solution pattern. If a solution includes one or more of the domain-specific features, the scoring process gives the solution a higher score. The length of the solution may play an important role in deciding the quality of the solution. Generally, very short length text is not a good quality solution.

The core service may define a threshold length value, (e.g., any solution text with less than 3 keywords) which do not have any domain-specific features/patterns are assigned a low score by the service. Parts of Speech tagging identifies the presence of different parts of speech that can play an important role in deciding the quality of the solution. For example, verbs, nouns, pronouns, conjunctions, indefinite articles, etc., may be identified and tagged. Each type of term/part of speech can provide a weight to the total score of the solution. For example, solutions that do not include a verb may not receive high scores since verbs may receive the most weight. Furthermore, adjectives in conjunction with a verb are given more value. The core service may use these different parameters and input them into an algorithm for scoring which uses each of the different parameters to assign an initial automated QoS score to the incident-solution pair. The table below includes an example of automated QoS scores assigned to a plurality of incident/solution pairs.

| Pair ID | QoS |
|---|---|
| Incident/Solution #1 | 2.8 |
| Incident/Solution #2 | 3.0 |
| Incident/Solution #3 | 2.1 |
| Incident/Solution #4 | 1.9 |

Next, the core service may receive feedback from m number of SMEs for n number of incident-solution pairs, but not necessarily all of the SMEs assign QoS score to all of the incident-solution pairs in the dataset. An example of the scores receives from the SMEs is shown in the scoring array 210A shown in FIG. 2A. Here, each SME may assign a QoS score to only those incident-solution pairs they are most comfortable with (most knowledge) depending on their area of work. This way, the scores are more accurate. The resulting scores from the SMEs may be compared to the automated QoS scores generated by the core service. The differences between the SME scores and the automated QoS scores can be used to identify latent features (hidden features) that can be used to justify the scores from the SMEs. In FIG. 2A, the scoring array 210A includes a plurality of cells arranged two-dimensionally. For purposes of example, the cells in FIG. 2A include a score 212 assigned by an SME and a difference value 214 that shows the difference between the score 212 assigned by the SME and the automated QoS score assigned by the core service. This may not be included in the array, but it is shown here for purposes of example.

According to various embodiments, the service may assume that the latent features are explainable in a k-dimensional setting. In this case, the service may assume that every incident-solution pair can be represented with k-dimensional array. Similarly, every SME can also represent using a k-dimensional array.

Each QoS score can ideally be explained using the below equation. Here, the algorithm tries to find the values of the k-dimensional incident-solution pair and SMEs that best explains the QoS values assigned.

$$QoS_{prob-sol,SME} = q_{prob-sol}^{T} * P_{SME}$$

In this example, the core service may use a gradient descent algorithm to find or otherwise interpolate the missing latent parameter values. For example, the algorithm may find a gradient of a loss function with respect to the parameter values and update the parameter values. The loss function is based on the difference between the QoS that is assigned by the SME according based on the hidden latent features and automated QoS assigned to the pair by the system. The optimization algorithm can be written below as Equation 1:

$$\min_{q*,p*} \sum_{(u,i) \in k} \left( QoS_{prob-sol,SME} - q_{prob-sol}^{T} * p_{SME} \right) + \lambda \left( \|q_{prob-sol}\|^2 + \|p_{SME}\|^2 \right) \qquad \text{Equation 1}$$

In Equation 1, $QOS_{prob-sol,SME}$ corresponds to the score that is provided by an SME which updates an automated score from the core service, $q_{prob-sol}$ corresponds to problem solution pair representation in terms of latent feature values, and $P_{SME}$ corresponds to the SME evaluation criteria represented in terms of latent feature values. The optimization algorithm may include an L-2 regularization to account for the nature of the reviewer. In this example, k is set to 2 which corresponds to the number of latent features. With that, the algorithm can be solved using the above optimization. In particular, the scoring array 210A that includes the initial QoS scores from four different SMEs can be decomposed into two sub-arrays that are (m*k) and (k*n) in size, respectively. In this example, since k=2, the sub-arrays 220 and 230 have the sizes of m*2 and 2*n, respectively. The decomposition results in the two sub-arrays 220 and 230 which represent the latent features. The latent features can then be used to assign QoS scores to all the incident-solution pairs for all SMEs as shown in the example of FIG. 2B. Here, missing values/empty fields of the scoring array 210A are filled-in based on the latent features to generate the filled-in array 210B which includes both actual and approximated SME scores for all incident-solution pairs. Here, the service may take the average of all the simulated and explicit SME scores to arrive at final QoS scores, referred to herein as LoQoS scores for each incident-solution pair. This information can be added to a third column of the training data set.

According to various embodiments, a user, such as a developer of the machine learning model may decide on a number of latent features (e.g., 2 features, 4 features, 20 features, etc.) included in the incident-solution pairs based on their subject matter experience. As another example, the number of latent features may be decided by an automated process such as a rules engine or a machine learning model that can automatically identify a number of latent features. The initial scores created by the core service are then stored. Next, SMEs may randomly selected different subsets of incident-solution pairs (e.g., having a domain/subject matter that they are knowledgeable about) and provide an updated score. The differences between the automated score initially provided by the core service and the updates scores provided by the SMEs leave an optimization problem.

As noted above, the number of latent features may be predetermined by a user, or automatically determined. That is, the optimization problem is used to find the latent feature parameter values but the number is set ahead time by a user. The optimization algorithm may learn the latent feature values by iteratively optimizing (i.e., minimizing) the error of the different adjusted metrics of the scores between the Q and the P in Equation 1. The initial automated value score has been corrected by the SMEs, and this has to be justified by the latent features. To solve the optimization problem, initially, random values may be used to fill out the latent feature parameter values. Then the values are updated (e.g., by 0.05, etc.) and this process repeats. The optimization algorithm is a min-max optimization algorithm. L-2 regularization is used to learn the features generically and prevent an overfit of the features within the model. This is the optimization problem used to minimize the error between Q and P.

FIG. 3 illustrates an architecture 300 of a neural network that has been boosted with a ReLU function 340 according to example embodiments. In this example, the neural network includes an architecture 300 of an autoencoder that includes a selective forget gate 310, a selective read gate 320, and a selective write gate 330. Here, $C_{t-1}$ represents a previous cell state of the LSTM, ht−1 represents a previous hidden output (e.g., latent features, etc.), $x_t$ represents a current text/word, $C_t$ represents the current cell state, and $h_t$ represents the current hidden output. The selective forget gate 310, the selective read gate 320, and the selective write gate 330 are typical of a traditional autoencoder. However, in the example embodiments, the architecture 300 is modified with a ReLU function 340. The ReLU function 340 is further explained below, and eliminates all negative outputs. The autoencoder may generate an output at each step based on a current word and a previous time step hidden state that is mathematically represented as follows:

$$o_t=\sigma(W_o h_{t-1}+U_o x_t+b_0)\sigma$$

$$i_t=\sigma\sim(W_i h_{t-1}+U_i x_t+b_i)$$

$$f_t=\sigma(W_f h_{t-1}+U_f x_t+b_f)$$

In FIG. 3, $C_{t-1}$ represents the previous state, $o_{t-1}$ represents the output gate 332 of the selective write gate 330, $i_t$ represents the selective input gate 322 of the selective read gate 320, and $f_t$ represents the selective forget gate 310. Furthermore, the selective write can be written as $$h_{t-1}=o_{t-1}\odot\sigma(C_{t-1})$$

As can be seen all the gates are a function of a current word and a previous time step hidden state and represented in terms of the model variables so that during back propagation the model can learn these parameters. Now using these gate parameters, the LSTM generates different states which are computed mathematically as below.

$$\tilde{C}_t=\sigma(W h_{t-1}+U x_t+b)$$

$$C_t=f_t\odot C_{t-1}+i_t\odot\tilde{C}_t$$

$$h_t C_t=o_t\odot\sigma(C_t)$$

Here, $\tilde{C}_t$ represents the current temporary state, $h_t$ represents the selective read, and $C_t$ represents the final state. All of these operations can be represented with the following LSTM function for use in training the machine learning model.

$$h_t C_t=\text{LSTM}(h_{t-1},C_{t-1},x_t)$$

In the example embodiments, the model is dealing with a specific scenario of a business word, but the naïve behavior of the basic LSTM cell is modified with the ReLU function 340 after the output gate 332 of the selective write gate 330. Here, the ReLU function 340 is added to decrease the naïve behavior of the vanilla LSTM cells and to account for the huge amount of information that is passing through the model by concatenating the incident details from two different sources. To create this cell state dimension independence, a fully connected single-layer neural network with a rectified linear unit (ReLU) function 340 can be used after the selective write gate 330. The ReLU function 340 can eliminate negative outputs by automatically converting negative values to zero. This modified LSTM is the backbone of the encoder decoder model which is described herein as rb-LSTM, ReLU boosted LSTM. The rb-LSTM can be explained as LSTM cell followed by the ReLU function 340. Due to ReLU function 340, the output for the negative valued dimension will be fixed and equal to zero. Because of that the overall memory requirement in case of rb-LSTM also reduces and training space complexity reduces.

In the example embodiments, the neural network uses the LSTMs as the encoder architecture in place of a simple recurring neural network (RNN) to ensure that the model does not suffer from vanishing or exploding gradients. At the same time, the LSTMs are very good at capturing the long-term dependencies by following the selective read, selective forget and selective write functions. The encoder-decoder model can have a training phase where the model is learning and an inference phase or a live phase where the trained model receives live data and makes predictions.

Figure 4:
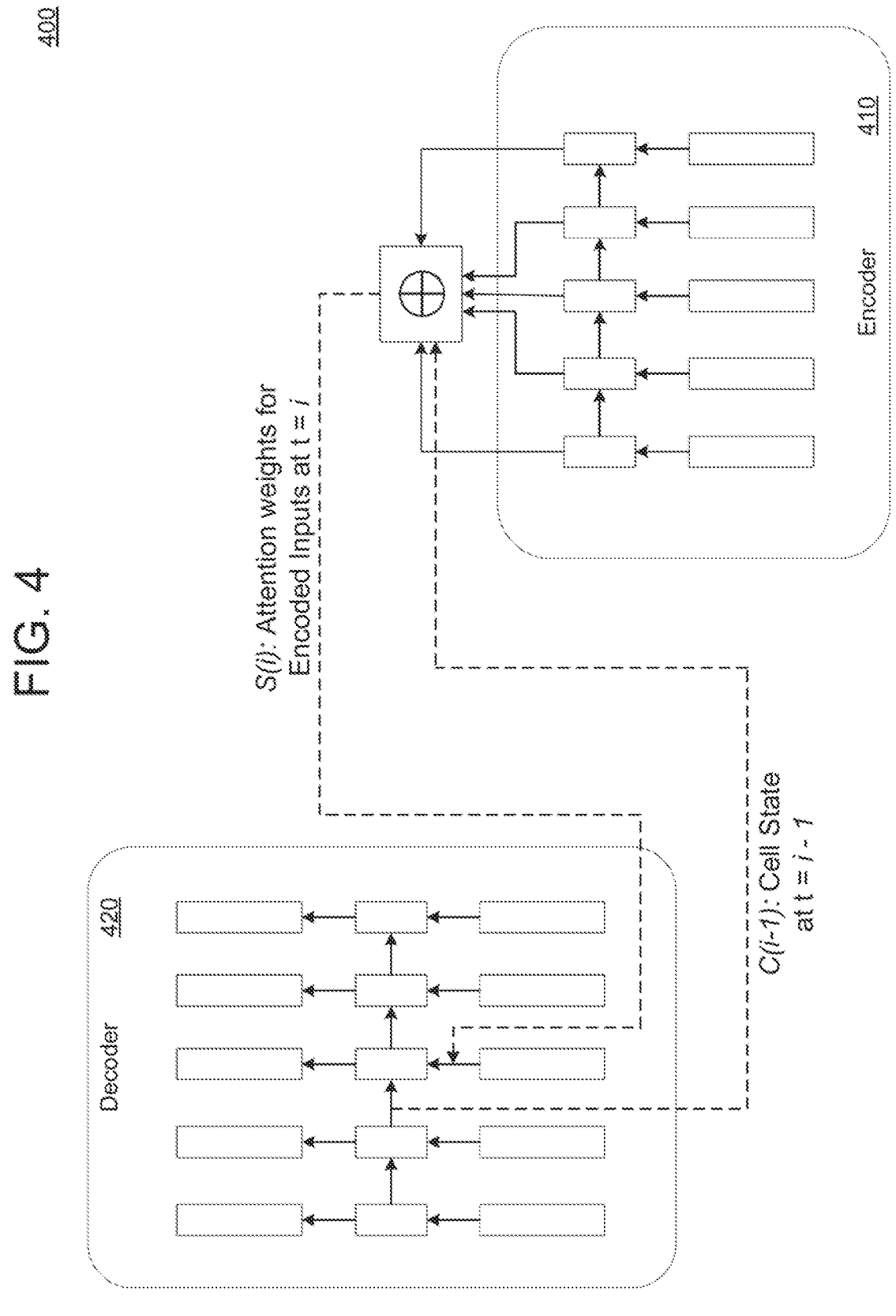
FIG. 4 is a diagram illustrating an autoencoder architecture based on the rb-LSTM of FIG. 3, according to example embodiments.

Referring to FIG. 4, a process 400 of training a model including an encoder 410 and a decoder 420 is shown. Here, the encoder 410 and the decoder 420 are initial designed and then trained to predict a target sequence offset by one timestep. The basic building unit of the encoder is an rb-LSTM that is boosted by a ReLU function. The encoder is fed the entire input text sequence (e.g., the incident, etc.), one word at each timestep. The entire incident gets feed. Here, the information passed gets processed and the encoder 410 captures the contextual information while processing, present in the sequence. At each timestamp the rb-LSTM cells will provide two functional outputs namely the hidden state (hi) and the cell state (ci). But in case of encoder decoder architecture the task of the encoder is produce a multidimensional array of numbers capturing the contextual information present in the input sequence. Therefore, the state output that will be used by the decoder as the input is hidden. The last timestep hidden state is used to initialize the decoder. The decoder is also an architecture built using the rb-LSTM basic building block. Mathematically, at any time step "t" the output of encoder LSTM cell is:

$$h_t=\text{rb-LSTM}(h_{t-1},x_{it})$$

The decoder 420 also includes an rb-LSTM basic building unit which reads the entire target sequence word-by-word and predicts the same sequence offset by one timestep. In this example, the decoder 420 may be trained to predict the next word in the sequence given the previous word and the input that is produced by the encoder. This simulates the rb-LSTM behavior. The operation of the decoder can mathematically be explained as:

First-time step input for decoder=$C_o$=$h_T$

Intermediate Cell state output for decoder=$C_t$=$rb$–LSTM($C_{t-1}$,$e(\hat{y}_{t-1})$)

Word prediction at each timestep by decoder=$P(y_t|y_1^{t-1},x)$=softmax(ReLU($V^*C_t$+$b$))

In some embodiments, special tokens such as <start> and <end> can be added to the target sequence before feeding it into the decoder 420. This enables the decoder to know when to start and stop predicting based on the position of the tokens. For example, the model may predict the target sequence by passing the first word into the decoder which would be always the <start> token. And the <end> token signals the end of the input sequence. The entire model (e.g., encoder 410 and decoder 420) can be mathematically represented as:

Encode $h_t$=$rb$–LSTM($h_{t-1}$,$x_{it}$)

Decode $C_o$=$h_T$ $C_t$=$rb$–LSTM($C_{t-1}$,$e(\hat{y}_{t-1})$)

$P(y_t|y_1^{t-1},x)$=softmax(ReLU($V^*C_t$+$b$))

Furthermore, a sigmoid function of the neural network can be defined as follows:

$$y = \frac{1}{1 + e^{-(\omega^T x + b)}},$$

Accordingly, the optimization problem can be a convex optimization problem with the below parameters and function that have a minima represented by a loss function that is being found by the example embodiments.

$U_{dec}$, $V$, $W_{dec}$, $U_{enc}$, $W_{enc}$, $b$      Parameters $$\mathcal{L}(\theta) = \sum_{i=1}^{T} \mathcal{L}_t(\theta) = \sum_{t=1}^{T} \log P\left(y_t = y_t \mid y_1^{t-1} x\right) \quad \text{Loss}$$

Via the model, it may be observed that some of the features are highly dense and some features are highly sparse. To ensure convergence and better learning the training process may use an adaptive learning rate depending on the feature property. At the same time, the training can use the momentum of the gradient of loss function with respect to parameters for faster convergence. The weight update mechanism takes care of that as can be mathematically explained as follows:

Momentum Building    $m_t = \beta_1 * v_{t-1} + (1 - \beta_1)(\nabla \omega_t)$

Adaptive Learning Rate    $v_t = \beta_2 * v_{t-1} + (1 - \beta_2)(\nabla \omega_t)^2$ parameter updation    $\omega_{t+1} = \omega_t - \frac{\eta}{\sqrt{(v_t)} + \epsilon} m_t$ The entire iterative process can be represented as an algorithm as shown below.
Initialize $\omega$, $b$ Iterate over data:

Compute $\hat{y}$

Compute $\mathcal{L}(\omega, b)$ $\omega_{11} = \omega_{111} - \eta \Delta \omega_{111}$ $\omega_{112} = \omega_{112} - \eta \Delta \omega_{112}$

..............

$\omega_{113} = \omega_{113} - \eta \Delta \omega_{113}$ till satisfied

To address the overfitting problem, L2-Regularization may be used. LT-Regularization is a technique referred to as ridge regression that adds a squared magnitude of coefficient as a penalty term to a loss function. That is, while minimizing the loss function with respect to parameters the model also reduces the summation of the square of the parameters. This way the possible values that the parameters can take gets restricted and the training avoids an overfitting region. The impact of the introduction of L2-Regularization can be mathematically explained as below:

$$\min_{\theta} \mathcal{L}(\theta) = \mathcal{L}_{train}(\theta) + \Omega(\theta)$$

$$\mathcal{L}_{train}(\theta) = \sum_{t=1}^{T} (y_i - f(x_i))^2$$

$$\Omega(\theta) = W_{111}^2 + W_{112}^2 + \cdots + W_{Lnk}^2$$

$$\Delta W_{ijk} = \frac{\partial \mathcal{L}(\theta)}{\partial W_{ijk}}$$

$$= \frac{\partial \mathcal{L}_{train}(\theta)}{\partial W_{ijk}} + \frac{\partial \Omega(\theta)}{\partial W_{ijk}}$$

The optimization problem after introducing the L2 regularization becomes as follows:

$$\min_{\theta} \left( \sum_{t=1}^{T} \left(\log P\left(y_t = y_t \mid y_1^{t-1} x\right)\right) + W_{111}^2 + W_{112}^2 + \cdots + W_{Lnk}^2 \right),$$

where $\theta$ is $U_{dec}$, $V$, $W_{dec}$, $U_{enc}$, $W_{enc}$, $b$

After training, the model can be tested on new source sequences for which the target sequence is unknown. The inference architecture can be setup to decode a test sequence. Here, the model may pass the entire input sequence through the encoder architecture through different time steps and receive an encoded output for the entire input sequence. Then, the model may pass the <start> token as an input to the decoder. Now the model has the complete input cell state and the first input text which is <start>. Next, the model may execute the decoder code for one time step. The decoder provides a probability distribution across the corpus of words and the word with maximum probability gets selected and returned. The model can then use the predicted word as the input for the decoder in the next time step along with the new modified cell state, calculated as rb-LSTM cell as the new internal states. This process is repeated on the same sequence of execution until the decoder detects the <end> token or reaches the maximum length possible for the target sequence.

By developing the autoencoder architecture, the system also develops a global attention layer network. In some cases, the input sequence may be a long sequence where the model is trying to remember all the words seen might. In this case, not all of the words may be generated because of all the words in the input sequences. To address this, the model can implement the concept of an attention mechanism network which tells the model which words to focus at each time step while predicting the sequence. This is the basic intuition behind the attention mechanism. The attention network also has a certain set of parameters which are learned and which decide which words from the input sequence to focus on. So, suppose the $2^{nd}$ word at the $3^{rd}$ time step has no importance in deciding the predicted word, its value should be very close to 0. This weightage is defined by parameter alpha (a) with subscript j and t, where j is the word number from input sequence and t is the time instant as shown below.

$$\alpha_{jt} = f(S_{t-1}, h_j, \theta)$$

This parameter is a function of the cell state received from previous time step, a current hidden state, and some additional parameters as represented below. The model parameters can also be defined as:

$$e_{jt} = f_{ATT}(S_{t-1}, h_j)$$

The model parameters can be defined as follows after training:

$$e_{jt} = V_{att}^T \tanh(U_{att} s_{t-1} + W_{att} h_j)$$

At every time step, it is not the final encoder cell state, but it is the modified attended cell state that gets concatenated with the previous time step decoder output. This can be represented with below set of equations:

Earlier: Cell state @time step $t$ $C_t = rb\text{--}LSTM(C_{t-1}, [h_T, e(y_{t-1})])$ Attended hidden state:

$$S_t = \sum_{j=1}^{T} \alpha_{jt} * h_t$$

Now: Cell state @time step $t$ $C_t = rb\text{--}LSTM(C_{t-1}, [S_T, e(y_{t-1})])$ The model can use an embedding layer to convert the text data into vectorized representation. For this purpose, a tokenizer may be used to build the vocabulary and convert a word sequence to an integer sequence before it is fed into the autoencoder/neural network. The training data set that is created by the system can be split into two subsets include a training subset and a testing subset. Some of the model parameters are as follows:

1. Return Sequences=True: When the return sequences parameter is set to True, rb-LSTM produces the hidden state and cell state for every timestep
2. Return State=True: When return state=True, rb-LSTM produces the hidden state and cell state of the last timestep only
3. Initial State: This is used to initialize the internal states of the rb-LSTM for the first timestep
4. Stacked LSTM: Stacked LSTM has multiple layers of LSTM stacked on top of each other (i.e., stacked rb-LSTM cells.) This leads to a better representation of the sequence.

The trained autoencoder is a sequence to sequence model with an attention mechanism that can be represented as below which details the model function, data, task, parameters, learning algorithms and loss function used:

Data: $\{x_i = source_i, y_i = target\}_{i=1}^{N}$

Encoder:

$h_t = rb\text{--}LSTM(h_{t-1}, x_t)$ $C_0 = h_T$

Decoder:

$$e_{jt} V_{att}^T \tanh(U_{att} h_j + W_{att} C_t)$$

$$\alpha_{jt} = \text{softmax}(e_{jt})$$

$$S_t = \sum_{j=1}^{T} \alpha_{jt} h_j$$

$$C_t = rb - LSTM(C_{t-1}, [e(\hat{y}_{t-1}), S_t])$$

$$l_t = \text{softmax}(V * C_t + b)$$

Parameters: $U_{dec}$, V, W dec, $U_{enc}$, $W_{enc}$, b, $U_{att}$, $V_{att}$

Loss function: sparse categorical cross-entropy (converts the integer sequence to a one-hot vector on the fly)

Learning Algorithm: remains the same.

Hyperparameters and Architecture Used:

Encoder is 3 stacked rb-LSTM, Decoder is also a 3 stacked rb-LSTM

Global Attention Mechanism

Batch Size: 512

Evaluation Criteria: percentage overlap of the predicted and actual solution text.

Figure 5:
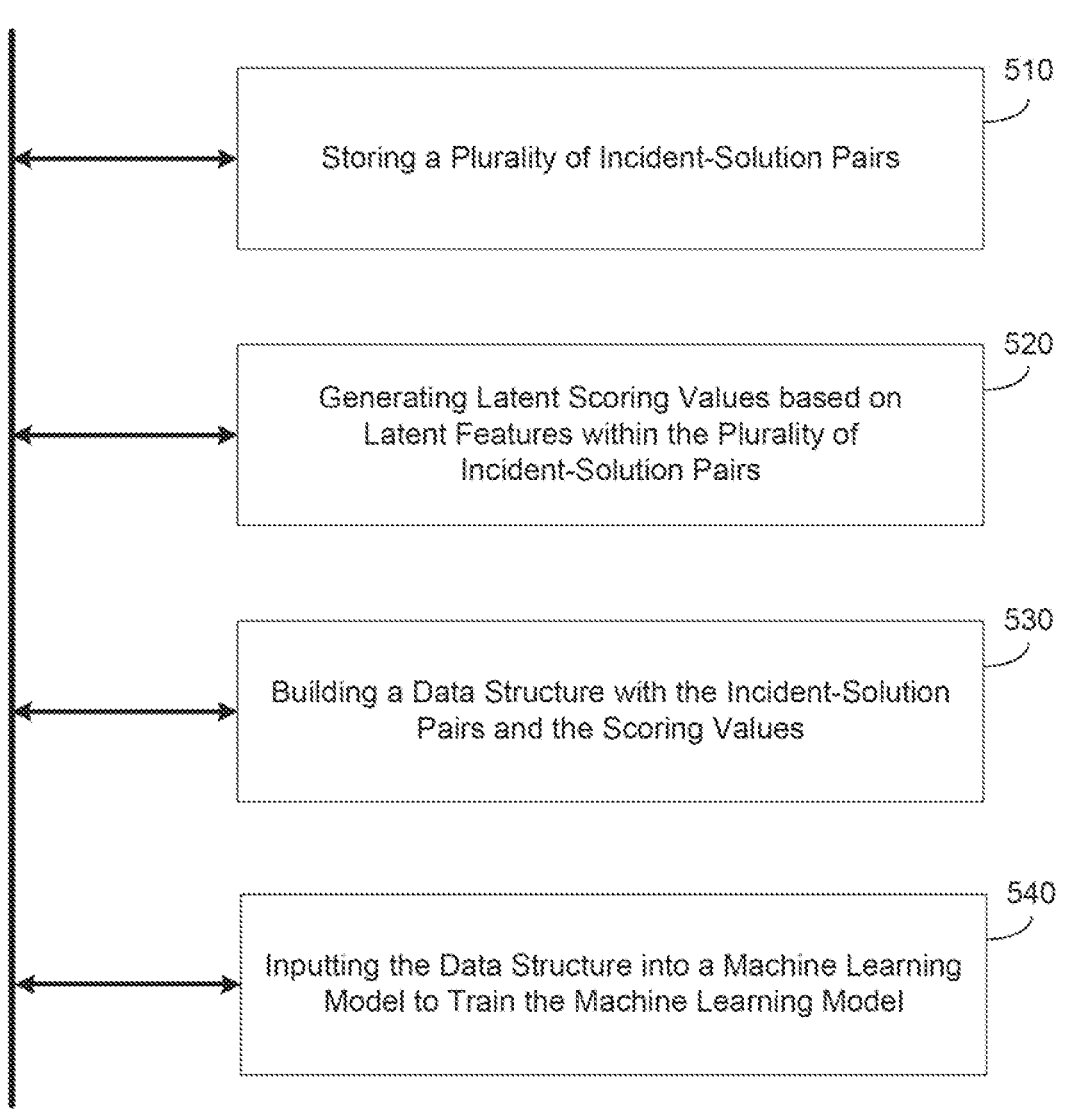
FIG. 5 is a diagram illustrating a method of scoring training data and training a machine learning algorithm according to example embodiments.

FIG. 5 illustrates a method 500 of. For example, the method 500 may be performed by a host platform such as a cloud platform, a web server, a database node, a distributed computing system, a user device, a software application, a combination thereof, and the like. Referring to FIG. 5, in 510, the method may include storing a plurality of incident-solution pairs. For example, text content of the incident and text content of a corresponding solution may be stored in two fields of a same row of a table of training data.

In 520, the method may include generating latent scoring values for the plurality of incident-solution pairs based on latent features within the text-based descriptions of the incident and/or the solution. In 530, the method may include building a two-dimensional data structure with incident-solution data from the plurality of incident-solution pairs stored therein, where each row in the data structure corresponds to a different incident-solution pair, and the data structure comprises one or more of a column for incident data, a column for solution data, and a column for latent scoring values. In 540, the method may include inputting the two-dimensional data structure into a machine learning model to train the machine learning model to identify solutions from incidents.

In some embodiments, each incident-solution pair may include a text-based description of an incident and a text-based description of a solution of the respective incident. In some embodiments, the method may further include automatically assigning quality scores to a subset of incident solution pairs, receiving updated quality scores for the subset of incident solution pairs from one or more users, and determining latent feature values based on an optimization algorithm and the updated quality scores.

In some embodiments, the method may further include assigning quality scores to a different subset of incident solution pairs based on the latent features determined from the subset of incident-solution pairs. In some embodiments, the assigning may include determining a quality score for an incident-solution pair based on one or more of predefined domain-specific patterns in a respective solution, a number of words used in the respective solution, and parts of speech identified in the respective solution.

In some embodiments, the machine learning model may include a neural network that includes an encoder and a decoder with a long short-term memory (LSTM). In some embodiments, the LSTM may include a rectified linear unit (ReLU) activation function that prevents negative outputs. In some embodiments, the method may further comprise extracting text content of the incident-solution pairs from a computer log, executing a natural language processing (NLP) model on the text content to clean the text content, and storing the cleaned text content of the incident-solution pairs in a document.

Figure 6:
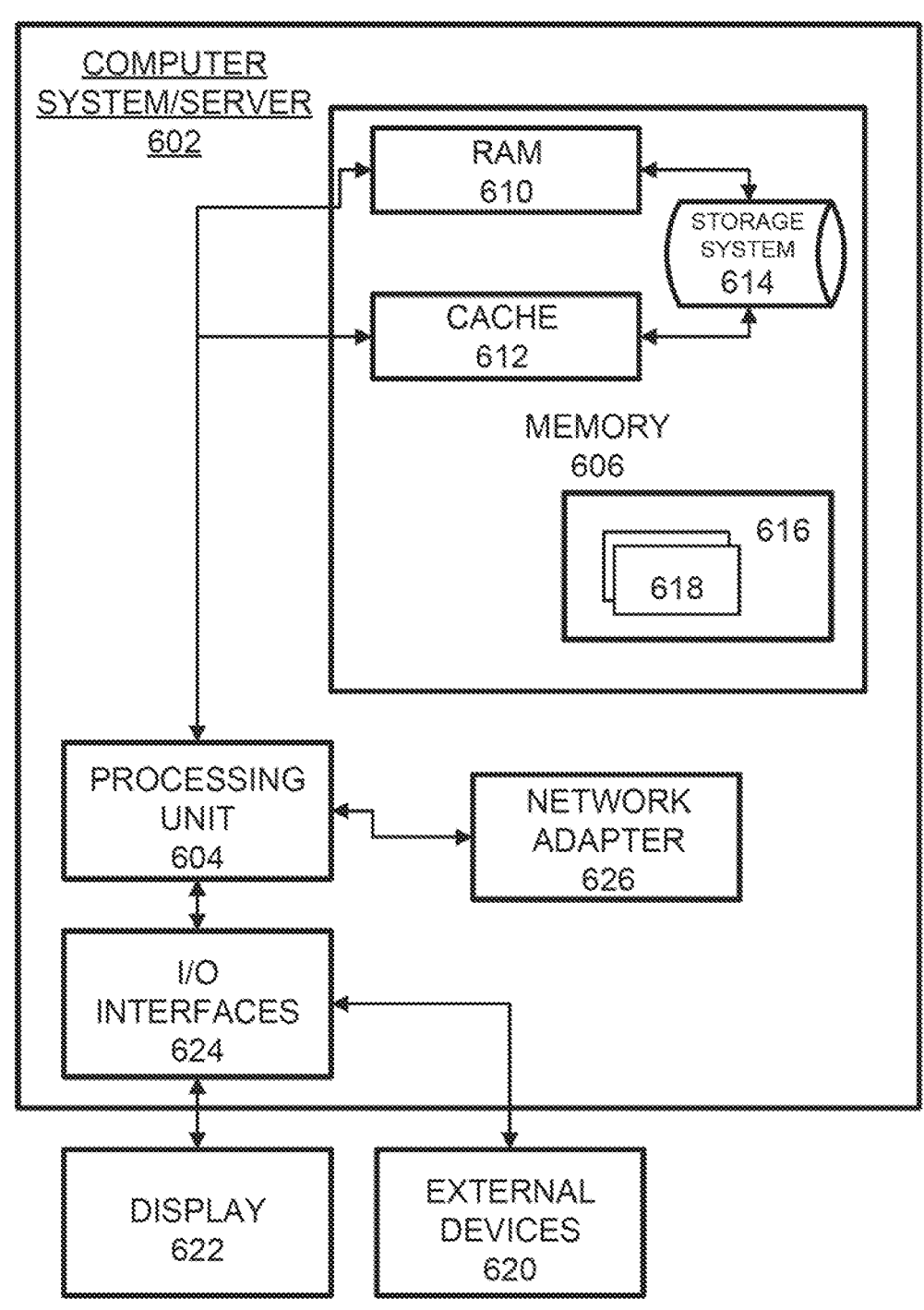
FIG. 6 is a diagram illustrating an example system that supports one or more of the example embodiments.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, micro-processor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in the system 600 is shown in the form of a general-purpose computing device. The components of computer system/server 602 may include, but are not limited to, one or more processors 604, a memory 606, and a bus that couples various system components including the memory 606 to the one or more processors 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. Memory 606, in one embodiment, implements the flow diagrams of the other figures. The memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the memory 606 may include at least one program product having a set (e.g., at least one) of program modules that are configured to carry out the functions of various embodiments of the application.

Program/utility 616, having a set (at least one) of program modules 618, may be stored in the memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples include, but are not limited to, microcode, device drivers, redundant processing units, external disk drive arrays, RAID systems, tape drives, and data archival storage systems, etc.

Although an exemplary embodiment of at least one of a system, method, and non-transitory computer-readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:

one or more processors; and one or more memory devices coupled to the one or more processors, wherein the one or more memory devices are configured to store a plurality of incident-solution pairs, and wherein the one or more processors are configured to:

generate latent scoring values for the plurality of incident-solution pairs based on a predetermined number of domain specific latent features identified within the plurality of incident-solution pairs;

build a data structure with incident-solution data from the plurality of incident-solution pairs stored therein, where each row in the data structure corresponds to a different incident-solution pair, and the data structure comprises one or more of a column for incident data, a column for solution data, or a column for the latent scoring values, wherein the latent scoring values are latent-space-oriented quality of solution (LoQoS) scores, wherein an incident-solution pair of the plurality of incident-solution pairs is assigned a lower LoQoS score based on a determination that a respective solution has a length less than a threshold value and lacks one or more predefined domain-specific patterns;

remove a subset, of the plurality of incident-solution pairs, which have a LoQoS score that is below a predetermined threshold value from the data structure;

input the data structure, comprising incident-solution pairs of the plurality of incident-solution pairs having LoQoS scores above the predetermined threshold value, into a machine learning model to train the machine learning model to identify solutions from incidents, wherein the trained machine learning model comprises a plurality of long short-term memory (LSTM) cells, wherein each LSTM cell of the plurality of LSTM cells comprises a respective rectified linear unit (ReLU) function connected to an output of a respective selective write gate; and deploy an instance of the trained machine learning model in a runtime environment on a cloud platform to predict a solution text sequence based on an input incident text sequence received via an application programming interface.

2. The apparatus of claim 1, wherein each incident-solution pair comprises a text-based description of an incident and a text-based description of a solution of the incident.

3. The apparatus of claim 1, wherein the one or more processors are further configured to:

automatically assign quality scores to a subset of the plurality of incident-solution pairs, receive updated quality scores for the subset from one or more users, and determine latent feature values based on an optimization algorithm and the updated quality scores.

4. The apparatus of claim 3, wherein the one or more processors are further configured to:

assign quality scores to a different subset of the plurality of incident-solution pairs based on the latent feature values determined from the subset.

5. The apparatus of claim 3, wherein the one or more processors are configured to:

determine a quality score for an incident-solution pair of the plurality of incident-solution pairs based on one or more of predefined domain-specific patterns in a respective solution, a number of words used in the respective solution, and parts of speech identified in the respective solution.

6. The apparatus of claim 1, wherein the trained machine learning model comprises a neural network that includes an encoder and a decoder with a global attention network.

7. The apparatus of claim 1, wherein the ReLU function converts negative valued outputs to a zero value.

8. The apparatus of claim 1, wherein the one or more processors are further configured to extract text content of the plurality of incident-solution pairs from a computer log, execute a natural language processing (NLP) model on the text content to clean the text content, and store cleaned text content of the plurality of incident-solution pairs in a document in the memory.

9. A method comprising:

storing a plurality of incident-solution pairs;

generating latent scoring values for the plurality of incident-solution pairs based on a predetermined number of domain specific latent features identified within the plurality of incident-solution pairs;

building a data structure with incident-solution data from the plurality of incident-solution pairs stored therein, where each row in the data structure corresponds to a different incident-solution pair, and the data structure comprises one or more of a column for incident data, a column for solution data, or a column for the latent scoring values, wherein the latent scoring values are latent-space-oriented quality of solution (LoQoS)

scores, wherein an incident-solution pair of the plurality of incident-solution pairs is assigned a lower LoQoS score based on a determination that a respective solution has a length less than a threshold value and lacks one or more predefined domain-specific patterns;

removing a subset, of the plurality of incident-solution pairs, which have a LoQoS score that is below a predetermined threshold value from the data structure;

inputting the data structure, comprising incident-solution pairs of the plurality of incident-solution pairs having LoQoS scores above the predetermined threshold value, into a machine learning model to train the machine learning model to identify solutions from incidents, wherein the trained machine learning model comprises a plurality of long short-term memory (LSTM) cells, wherein each LSTM cell of the plurality of LSTM cells comprises a respective rectified linear unit (ReLU) function connected to an output of a respective selective write gate; and deploying an instance of the trained machine learning model in a runtime environment on a cloud platform to predict a solution text sequence based on an input incident text sequence received via an application programming interface.

10. The method of claim 9, wherein each incident-solution pair comprises a text-based description of an incident and a text-based description of a solution of the incident.

11. The method of claim 9, further comprising:

automatically assigning quality scores to a subset of the plurality of incident-solution pairs, receiving updated quality scores for the subset from one or more users, and determining latent feature values based on an optimization algorithm and the updated quality scores.

12. The method of claim 11, further comprising:

assigning quality scores to a different subset of the plurality of incident-solution pairs based on the latent feature values determined from the subset.

13. The method of claim 11, wherein the generating comprises determining a quality score for an incident-solution pair of the plurality of incident-solution pairs based on one or more of predefined domain-specific patterns in a respective solution, a number of words used in the respective solution, and parts of speech identified in the respective solution.

14. The method of claim 9, wherein the trained machine learning model comprises a neural network that includes an encoder and a decoder with a global attention network.

15. The method of claim 9, wherein the ReLU function converts negative valued outputs to a zero value.

16. The method of claim 9, further comprising:

extracting text content of the plurality of incident-solution pairs from a computer log, executing a natural language processing (NLP) model on the text content to clean the text content, and storing cleaned text content of the plurality of incident-solution pairs in a document.

17. A non-transitory computer-readable medium storing a set of instructions, the set of instructions comprising:

one or more instructions that, when executed by one or more processors of a device, cause the device to:

store a plurality of incident-solution pairs;

generate latent scoring values for the plurality of incident-solution pairs based on a predetermined number of domain specific latent features identified within the plurality of incident-solution pairs;

build a data structure with incident-solution data from the plurality of incident-solution pairs stored therein, where each row in the data structure corresponds to a different incident-solution pair, and the data structure comprises one or more of a column for incident data, a column for solution data, or a column for the latent scoring values, wherein the latent scoring values are latent-space-oriented quality of solution (LoQoS) scores, wherein an incident-solution pair of the plurality of incident-solution pairs is assigned a lower LoQoS score based on a determination that a respective solution has a length less than a threshold value and lacks one or more predefined domain-specific patterns;

remove a subset, of the plurality of incident-solution pairs, which have a LoQoS score that is below a predetermined threshold value from the data structure;

input the data structure, comprising incident-solution pairs of the plurality of incident-solution pairs having LoQoS scores above the predetermined threshold value, into a machine learning model to train the machine learning model to identify solutions from incidents, wherein the trained machine learning model comprising a plurality of long short-term memory (LSTM) cells, wherein each LSTM cell of the plurality of LSTM cells comprises a respective rectified linear unit (ReLU) function connected to an output of a respective selective write gate; and deploy an instance of the trained machine learning model in a runtime environment on a cloud platform to predict a solution text sequence based on an input incident text sequence received via an application programming interface.

18. The non-transitory computer-readable medium of claim 17, wherein each incident-solution pair comprise a text-based description of an incident and a text-based description of a solution of the respective incident.

19. The non-transitory computer-readable medium of claim 17, wherein the one or more instructions further cause the device to:

automatically assign quality scores to a subset of the plurality of incident-solution pairs, receive updated quality scores for the subset from one or more users, and determine latent feature values based on an optimization algorithm and the updated quality scores.

20. The non-transitory computer-readable medium of claim 19, wherein the one or more instructions further cause the device to:

assign quality scores to a different subset of the plurality of incident-solution pairs based on the latent feature values determined from the subset.

\* \* \* \* \*